United States Patent Office 3,399,154
Patented Aug. 27, 1968

3,399,154
RIGID POLYURETHANE FOAMS AND POLY-
ESTERS FOR USE THEREIN
Carl Bernstein, Deerfield, and Kermit Longley, Park
Forest, Ill., assignors to Witco Chemical Company, Inc.,
New York, N.Y., a corporation of Delaware
No Drawing. Original application Oct. 22, 1965, Ser. No.
502,516, now Patent No. 3,298,974, dated Jan. 17, 1967.
Divided and this application Jan. 16, 1967, Ser. No.
622,841
7 Claims. (Cl. 260—22)

ABSTRACT OF THE DISCLOSURE

Polyesters having particular utility for the preparation of rigid polyurethane foams, said polyesters comprising esterification reaction products of (a) a mixture of an aromatic dicarboxylic acid compound, e.g. phthalic anhydride, and a higher fatty acid, e.g. oleic acid, with (b) an ethylene oxide adduct of an aliphatic polyhydric alcohol containing at least 3 hydroxy groups, said adduct containing from 10 to 22 milli-equivalents, per gram, of hydroxyl groups, said polyester having an hydroxyl number between 400 and 600.

---

This is a division of application Ser. No. 502,516, filed Oct. 22, 1965, now U.S. Patent No. 3,298,974, issued Jan. 17, 1967, and a continuation-in-part of application Ser. No. 274,855, filed Apr. 22, 1963, which is a continuation-in-part of application Ser. No. 808,315, filed Apr. 23, 1959, both of said applications having been abandoned.

Polyesters used in the production of rigid foams are described in numerous patents and publications illustrative of which are U.S. Patents Nos. 2,806,835, 2,806,836, 2,811,493, 2,836,575 and 2,846,408. The usual polyesters are made by reacting a dicarboxylic acid preferably adipic acid, and a triol such as trimethylolpropane (TMP). A variant form comprises replacing about 15% by weight of the adipic acid with phthalic anhydride. Since phthalic anhydride is materially cheaper than adipic acid; and since polyesters utilizing phthalic anhydride exhibit better properties, particularly when foamed with fluorohydrocarbon inert gases such as Freon 11, Genetrol 11, and Isotron 11 (as described, for instance, in Republic of South Africa Patent No. 3,329/56), since the resulting foams retain such gases for longer periods of time than where adipic acid alone is used in the production of the polyesters, it is highly desirable to be able to employ as much phthalic anhydride as possible in the preparation of the polyesters. Unfortunately, however, when adipic acid is replaced by phthalic anhydride, the resulting polyesters are considerably more viscous than in the case where adipic acid is utilized as the polycarboxylic acid constituent of the polyesters. While efforts have heretofore been made, therefore, to attempt to utilize as much phthalic anhydride as possible in place of adipic acid, in general, only very minor proportions of phthalic anhydride, generally not more than about 25% by weight of the mixture of adipic acid and phthalic anhydride, can be utilized with reasonable satisfaction for the production of the polyesters used for the manufacture of rigid foams. It has also heretofore been proposed, as shown in U.S. Patent No. 3,138,562, to produce cellular polyurethane plastics comprising rigid foams utilizing polyesters made by reacting together (1) aliphatic polyhydric alcohols (such as trimethylolpropane), (2) polycarboxylic acids or mixtures thereof (such as adipic acid and phthalic anhydride), (3) long chain unsaturated fatty acids (such as oleic acid), and (4) polyhydric polyalkylene ethers having a molecular weight of at least about 400 and in which at least about 50% of the alkylene radicals contain at least 3 carbon atoms (such as various propoxylated trimethylol propanes). Such polyesters are radically different from the polyesters utilized pursuant to our invention, the polyesters of said Patent No. 3,138,562 using large proportions of free polyhydric alcohols in the polyester esterification and being characterized in that the adducts which are utilized have very low contents of hydroxyl groups (of the order of 1 to 4 milli-equivalents, per gram, of hydroxyl groups) and in that the adducts require the presence of at least 50% of the alkylene radicals being in the form of alkylene radicals containing at least 3 carbon atoms. Moreover, the compressive strengths of the foams produced pursuant to disclosures of said patent are, generally, materially less than the compressive strengths of rigid foams produceable in accordance with our present invention.

The problems involved in the production of satisfactory polyesters for utilization in the manufacture of rigid foams are of multiple character. Not only is there the aspect of cost involved but, also, there are problems relating to viscosities, good water resistance, and good retention of the gases which are utilized in the production of the foams, particularly the inert fluorohydrocarbons. To attempt to meet the problems, various approaches have been suggested. Certain of them have involved the production of polyethers. Various of the polyether-type materials, although producing rigid foams, commonly produce foams which are friable unless cured at elevated temperatures for a short time or at room temperature for extended periods. In any event, no adequately satisfactory solution has been found to meet the several problems involved.

The present invention is based on the discovery of new and highly useful polyesters which are very inexpensive to manufacture, and on the production of rigid polyurethane foams utilizing said polyesters, said foams having highly satisfactory properties for the uses to which such foams are conventionally placed, as, for instance, as insulating materials in the refrigeration industry. The polyesters, made in accordance with our invention, can utilize phthalic anhydride entirely as the dicarboxylic acid reactant or, if desired, upwards of 25% of the total dicarboxylic acid utilized in the production of the polyesters can be phthalic anhydride. Furthermore, in certain broader aspects of the invention, no phthalic anhydride need be utilized and polyesters are obtained with other dicarboxylic acids which possess highly advantageous properties, particularly for use in the production of rigid polyurethane foams. In a still further aspect of our invention, novel esters or polyesters are produced wherein no dicarboxylic acid or polycarboxylic acid is utilized, and such esters or polyesters are usable to produce excellent rigid polyurethane foams.

In order to achieve the advantageous results of the present invention, it has been found, among other things, that there should be used, in the production of the esters or polyesters of the present invention, an ethylene oxide adduct of an aliphatic polyhydric alcohol having at least three hydroxy groups and, more particularly, an aliphatic polyhydric alcohol having from 4 to 6 hydroxy groups, the ethylene oxide content of said adduct being controlled so as to lie within certain ranges as set forth below. More specifically, we have found that the ethylene oxide adduct of the polyol must be of such character that, for each mol of said polyol, which in the usual case will be an aliphatic polyhydric alcohol containing from 3 to 6 carbon atoms, such a number of mols of ethylene oxide is reacted therewith as to produce an adduct which contains from 10 to 22 milli-equivalents, per gram, of hydroxyl groups. In addition, we have found that, in order to achieve the best results in accordance with our invention, said polyesters should have certain hydroxyl numbers. Thus, where the polyesters are produced from the aforesaid adducts by esterification with dicarboxylic acids alone (or with dicarboxylic acids containing minor amounts of tricarboxylic or higher polycarboxylic acids), as described below, the hydroxyl numbers should lie between 280 and 550 and, more particularly, in the range of 320 to 500. Where the polyesters are produced from the aforesaid adducts by esterification with mixtures of dicarboxylic acids (or with dicarboxylic acids containing minor amounts of tricarboxylic acids or higher polycarboxylic acids) and water-immiscible higher molecular weight monocarboxylic or fatty acids, as described below, the hydroxyl numbers should lie between 400 and 600 and, more particularly, in the range of 450 to 500. Where the esters or polyesters are produced from the aforesaid adducts by esterification with water-immiscible higher molecular weight monocarboxylic or fatty acids and little or no dicarboxylic or other polycarboxylic acids, as described below the hydroxyl numbers should lie between 500 and 800 and, more particularly, in the range of 600 to 700.

Various aliphatic polyhydric alcohols or polyols, or mixtures of any two or more thereof, containing at least 3 hydroxyl groups, can be utilized as the starting material with which the ethylene oxide is reacted to produce the adducts which are then reacted as pointed out below to produce the polyesters. Among such aliphatic polyhydric alcohols are, for instance, glycerol, trimethylolpropane, triethylolpropane, trimethylolethane, triethanolamine, hexanetriols, pentaerythritol, dipentaerythritol, polyglycerols such as diglycerol, triglycerol, tetraglycerol and higher polyglycerols and mixtures thereof, sorbitol, mannitol, and the like. It is especially advantageous to use aliphatic polyhydric alcohols containing from 4 to 6 hydroxyl groups, or mixtures thereof with aliphatic polyhydric alcohols containing 3 hydroxyl groups.

The ethylene oxide content in the adducts of the polyols will vary depending upon the number of hydroxyl groups present in the polyol. Thus, for example, in the case of trimethylolpropane, for each mol of the trimethylolpropane the ethylene oxide content of the adduct is from about 0.5 mol to not substantially in excess of 3 mols. In the case of sorbitol, for each mol thereof present in an adduct with ethylene oxide, the number of mols of ethylene oxide will range from about 3 mols to about 8 mols. The governing criterion in this regard, however, as stated previously, is that the adduct contains from 10 to 22 milliequivalents, per gram, of hydroxyl groups. It is particularly preferred that said adducts be made with ethylene oxide as the sole adducting alkylene oxide. However, minor proportions of other alkylene oxides can be used in producing the adducts, such as propylene oxide or butylene oxides. Where used, the mol ratio of the ethylene oxide to the propylene oxide or butylene oxide should be at least 2 to 1 and, more advantageously, said mol ratio should be at least 4 to 1. Generally speaking, the use of propylene oxide or butylene oxide in the production of the adducts results in polyesters with higher viscosities and in rigid polyurethane foams produced from such polyesters which have a greater tendency to shrinkage. Where propylene oxide or butylene oxide is used in the production of the adduct, it may be reacted after or before the ethylene oxide is adducted with the polyhydric alcohol. Conventional techniques of adducting polyhydric alcohols with alkylene oxides may be used.

It has been found, surprisingly, among other things, as has been indicated above, that, when adducts of the character described above are esterified with phthalic anhydride or with mixtures of adipic acid and phthalic anhydride in which the phthalic anhydride content is at least 25% of the total of the mixture of adipic acid and phthalic anhydride, polyesters are obtained having unusually relatively low viscosities. Generally speaking, polyesters are readily produced in accordance with the present invention in which the viscosities, measured in centipoises (cps.) at 25 degrees C., are in the range of 20,000 to 60,000. It is preferred, for use in the production of rigid polyurethane foams, that the viscosities of said polyesters do not exceed 100,000 cps. at 25 degrees C., and, more desirably, that they lie in the range of 40,000 to 60,000 cps.

In one particularly advantageous aspect of our invention (the polyesters are derived from the esterification of the above-described adducts with phthalic anhydride alone as the carboxylic acid ester-forming constituent, or with phthalic anhydride constituting at least 25% and, better still, at least 40% of the total of the polycarboxylic acid utilized in the esterification reaction to produce the polyesters. In one of its broader aspects, our invention contemplates the utilization of other aromatic polycarboxylic acid, or mixtures of two or more thereof, in place of or in conjunction with phthalic anhydride as, for instance, terephthalic acid, isophthalic acid, trimellitic acid, chlorendic anhydride and chlorendic acid, and naphthalene dicarboxylic acid. It also contemplates the employment, in place of adipic acid, of other aliphatic polycarboxylic acids which have been conventionally used in the production of polyesters for the manufacture of rigid polyurethane foams as disclosed, for instance, in various of the patents mentioned herein. However, the employment of adipic acid and dimeric acids such as those sold under the designation 3065–S (Emery Industries) as the aliphatic polycarboxylic acid, in those instances in which an aliphatic polycarboxylic acid is utilized, is particularly preferred. In those instances in which polycarboxylic acids are utilized to esterify the aforesaid adducts to produce the polyesters of the present invention, dicarboxylic should constitute at least the substantially major polycarboxylic acid constituent. Tricarboxylic acid can be utilized in distinctly minor proportions but they tend to result in the production of polyesters with unduly high viscosities and it is preferred to avoid their use entirely. Where used, they should be employed in proportions such as not to result in polyesters having viscosities in excess of 100,000 cps. at 25 degrees C.

As stated above, certain of the novel esters of polyesters of our present invention are made by esterification of the above-described adducts with dicarboxylic acids in admixture with water-immiscible higher molecular weight monocarboxylic or fatty acids, or by esterification of said adducts with water-immiscible higher molecular weight monocarboxylic or fatty acids alone. Among such monocarboxylic or fatty acids are lauric acid, myristic acid, palmitic acid, stearic acid, oleic acid, tall oil fatty acids, linoleic acid, ricinoleic acid and mixtures of two or more of such monocarboxylic acids, including such mixtures as are or may be derived from commercial sources. It is particularly preferred, so far as this phase of our invention is concerned, to utilize oleic acid or tall oil fatty acids or similar unsaturated monocarboxylic acids because the saturated monocarboxylic acids tend to produce polyesters with unduly high viscosities. The utilization of monocarboxylic acids in the production of the esters or polyesters results, among other things, in esters or polyesters having increased solubility in fluorohydrocarbons, such as Freon 11, which is advantageous in those procedures in which rigid polyurethane foams are produced where the gas-producing agent is a fluorohydrocarbon, since, ordinarily, the fluorohydrocarbons used in such processes are not very soluble in the polyesters which are conventionally used in producing rigid polyurethane foams. While, as stated above, esters or polyesters of the above-described adducts can be made with the aforementioned monocarboxylic acids alone, it is desirable to utilize a proportion of a dicarboxylic acid together with said monocarboxylc acids since this results in a greater rigidity of the rigid polyurethane foams made from said polyesters. The relative proportions of the dicarboxylic acids and the monocarboxylic acids, where mixtures of both are used, are variable within wide limits, the dicarboxylic acid being either appreciably greater or appreciably less than the monocarboxylic acid on a weight basis. Thus, for instance, and as will be apparent from the following examples, the monocarboxylic acids, such as oleic acid or tall oil fatty acids, may constitute 50% to 150% by weight of the dicarboxylic acid, or the dicarboxylic acid may constitute from 50 to 150% by weight of the monocarboxylic acid, with lesser or greater relative proportions as may be desired to obtain certain particular viscosities in the polyesters as well as various other properties.

The utilization of tall oil fatty acids, oleic acid, and like unsaturated higher fatty acids, in conjunction with phthalic anhydride or other dicarboxylic acids, in the production of various of the polyesters of the present invention, enables polyesters of lower viscosities to be produced, economics in cost are achieved, and production of excellent fine-celled rigid polyurethane foams is obtained by either the so-called "one shot" or "prepolymer" procedures or techniques.

The following examples are illustrative of the production of esters or polyesters made in accordance with our invention. It will be understood that numerous other esters or polyesters can readily be produced following the guidance and teachings disclosed herein without in any way departing from the principles of our invention.

EXAMPLE 1

2 mols of an adduct of 1 mol of TMP with 1.76 mols of ethylene oxide (said adduct containing approximately 14 milli-equivalents, per gram, of hydroxyl groups) are esterified with 0.5 mol of adipic acid and 0.5 mol of phthalic anhydride by heating at 220–250 degrees C. in an inert gas atmosphere, such as nitrogen, until a polyester is produced having an acid number of 1.5 and an hydroxyl number of 404. The said polyester has an unusually low viscosity, namely, about 22,000 cps. (25 degrees C.).

EXAMPLE 2

2 mols of an adduct of 1 mol of TMP with 1.76 mols of ethylene oxide are esterified, in the manner described in Example 1, with 1 mol of phthalic anhydride. The resulting polyester, having an acid number of 1.5 and an hydroxyl number of 386, has a comparatively low viscosity, namely, about 100,000 cps. (25 degrees C.).

EXAMPLE 3

2 mols of an adduct of 1 mol of sorbitol with 6 mols of ethylene oxide (said adduct containing about 13.5 milli-equivalents, per gram, of hydroxyl groups) are esterified, as described in Example 1, with 0.5 mol of adipic acid and 1 mol of phthalic anhydride.

EXAMPLE 4

2 mols of an adduct of 1 mol of pentaerythritol with 3 mols of ethylene oxide (said adduct containing about 15 milli-equivalents, per gram, of hydroxyl groups) are esterified, as described in Example 1, with 0.5 mol of isophthalic acid and 0.5 mol of adipic acid.

EXAMPLE 5

2 mols of an adduct of 1 mol of trimethylolethane with 2.5 mols of ethylene oxide (said adduct containing about 13 milli-equivalents, per gram, of hydroxyl groups) are esterified, as described in Example 1, with 0.75 mol of adipic acid and 0.5 mol of phthalic anhydride.

EXAMPLE 6

1 mol of an adduct of 1 mol of TMP with 1.75 mols of ethylene oxide (said adduct containing approximately 14 milli-equivalents, per gram, of hydroxyl groups) are esterified with 0.5 mol phthalic anhydride at a temperature of 225–250 degrees C. in an inert gas atmosphere. The resulting polyester has an acid number of 1.5 and an hydroxyl number of 402.

EXAMPLE 7

1 mol of an adduct of 1 mol of TMP with 1.75 mols of ethylene oxide are esterified with 0.25 mol adipic acid and 0.25 mol of phthalic anhydride at a temperature of 225–250 degrees C. in an inert gas atmosphere. The resulting polyester has an acid number of 1.5 and an hydroxyl number of 404.

EXAMPLE 8

1 mol of an adduct of 1 mol of TMP with 1.75 mols of ethylene oxide are esterified with 0.5 mol isophthalic acid at a temperature of 225–250 degrees C. in an inert gas atmosphere. The resulting polyester has an acid number of 0.2 and an hydroxyl number of 398.

EXAMPLE 9

1 mol of an adduct of 1 mol of TMP with 2.41 mols of ethylene oxide (said adduct containing about 12 milli-equivalents, per gram, of hydroxyl groups) are esterified with 0.5 mol of phthalic anhydride at a temperature of 225–250 degrees C. in an inert gas atmosphere. The resulting polyester has an acid number of 1.6 and an hydroxyl number of 365.

EXAMPLE 10

1 mol of an adduct of 1 mol of TMP with 2.41 mols of ethylene oxide are esterified with 0.59 mol phthalic anhydride at a temperature of 225–250 degrees C. in an inert gas atmosphere. The resulting polyester has an acid number of 1.7 and an hydroxyl number of 325.

EXAMPLE 11

1 mol of an adduct of 1 mol of TMP with 1.97 mols of ethylene oxide (said adduct containing about 13.5 milli-equivalents, per gram, of hydroxyl groups) are esterified with 0.5 mol of phthalic anhydride at a temperature of 225–250 degrees C. in an inert gas atmosphere. The resulting polyester has an acid number of 1.1 and an hydroxyl number of 386.

EXAMPLE 12

1 mol of an adduct of 1 mol of glycerol with 2.07 mols of ethylene oxide (said adduct containing about 16 milli-equivalents, per gram, of hydroxyl groups) are esterified with 0.5 mol phthalic anhydride at a temperature of 225–250 degrees C. in an inert gas atmosphere. The resulting polyester has an acid number of 1.2 and an hydroxyl number of 450.

EXAMPLE 13

252 g. of an adduct of 0.82 mol of TMP, 0.27 mol of pentaerythritol and 2.42 mols of ethylene oxide are esterified with 74 g. of phthalic anhydride at a temperature of 225–250 degrees C. in an inert gas atmosphere. The resulting polyester has an acid number of 0.6 and an hydroxyl number of 435.

EXAMPLE 14

An adduct was prepared from 124 grams of glycerol, 376 grams of pentaerythritol and 380 grams of ethylene oxide. 440 grams of said adduct were esterified with a mixture of 163 grams of phthalic anhydride and 99 grams of tall oil fatty acids at a temperature of 225–250 degrees C. in an inert gas atmosphere until the resulting polyester product had a hydroxyl number of 412 and an acid number of 1.

EXAMPLE 15

440 grams of the adduct used in Example 14 were esterified in the manner described in Example 14 with a mixture of 133 grams of phthalic anhydride and 155 grams of tall oil fatty acids until the resulting polyester product had a hydroxyl number of 421 and an acid number of 2. Its viscosity measured 30,000 cps. at 25 degrees C.

EXAMPLE 16

440 grams of the adduct used in Example 14 were esterified in the manner described in Example 14 with a mixture of 122 grams of phthalic anhydride and 175 grams of tall oil fatty acids until the resulting polyester product had a hydroxyl number of 417 and an acid number of 0.5. Its viscosity measured 20,000 c.p.s., at 25 degrees C.

EXAMPLE 17

440 grams of the adduct used in Example 14 were esterified in the manner described in Example 14 with a mixture of 140 grams of phthalic anhydride and 70 grams of tall oil fatty acids until the resulting polyester product had a hydroxyl number of 480 and an acid number of 1.

EXAMPLE 18

517 grams of an adduct, prepared from 188 grams of pentaerythritol, 62 grams of glycerol and 267 grams of ethylene oxide, were esterified with 103.5 grams of phthalic anhydride and 86 grams of oleic acid by heating the same at 225–250 degrees C. in an inert atmosphere until a polyester was produced having a hydroxyl number of 468, an acid number of 1.8, and a viscosity at 25 degrees C. of 10,000 c.p.s.

EXAMPLE 19

517 grams of the adduct of Example 18 were esterified with 89 grams of phthalic anhydride and 114 grams of oleic acid, in the manner described in Example 18, to produce a polyester having an hydroxyl number of 466, an acid number of 1, and a viscosity at 25 degrees C. of 6,000 c.p.s.

EXAMPLE 20

222 grams of an adduct prepared from 94 grams of pentaerythritol, 31 grams of glycerol and 97 grams of ethylene oxide were esterified with 113 grams of oleic acid, in the manner described in Example 18, to produce a polyester having an hydroxyl number of 595 and an acid number of 1.

EXAMPLE 21

258 grams of an adduct prepared from 94 grams of pentaerythrito,l 31 grams of glycerol and 133 grams of ethylene oxide were esterified with 70 grams of oleic acid, in the manner described in Example 18, to produce a polyester having an hydroxyl number of 610 and an acid number of 1.

EXAMPLE 22

1 mol of an adduct of 1 mol of TMP with 1.4 mols of ethylene oxide (said adduct containing approximately 15 milli-equivalents, per gram, of hydroxyl groups) are esterified with 0.25 mol adipic acid and 0.25 mol of phthalic anhydride at a temperature of 225–250 degrees C. in a nitrogen atmosphere. The resulting polyester has an acid number of 1.5 and a hydroxyl number of 408.

In connection with the preparation of rigid polyurethane foams from the polyesters of this invention, as has previously been indicated it is especially desirable to produce them by utilization of inert gas forming or propellant techniques such as disclosed, for instance, by the aforementioned South Africa patent. The source materials or propellants are those halogen-substituted alkanes which are either gaseous or which are liquids with a boiling point not materially higher than room temperature at atmospheric pressure and in all cases lower than the reaction temperature of the polyester-diisocyanate mixture. The reference in the claims to the utilization of halogen-substituted alkanes will be understood to mean those halogen-substituted alkanes which possess the foregoing properties. They are, per se, known in the art. The said halogen-substituted alkanes are dissolved in the prepolymer and the resulting composition is mixed with the polyester, the temperature of the mixture then being permitted to rise above the boiling point of the gas in the mixture whereby to produce the polyurethane foam due to the expansion of the gas. Furthermore, as disclosed in said patent, carbon dioxide and oxides of nitrogen can be admixed with the halogen-substituted alkane and polyester. The disclosures of said patents, to the extent that they deal with the use of halogen-substituted alkanes for effecting foaming, are incorporated herein by reference. Monochlorodifluoromethane and dichlordifluoromethane are two of the particularly preferred halogen-substituted alkanes. While it is particularly advantageous to utilize such foaming technique, it will be understood that the foaming may also be accomplished by conventional techniques which rely upon the presence of small amounts of water cooperation with the polyisocyanates in forming the carbon dioxide gas which produces the foaming.

The esters of the present invention can be foamed by either prepolymer or one shot techniques. These techniques per se are known in the art. The following are typical examples, given solely by way of illustration, of the production of rigid polyurethane foams utilizing certain of the polyesters made in accordance with this invention as described above. It will be understood that numerous other examples will be readily apparent in the light of the guiding principles and teachings which are provided herein.

Example A

A prepolymer is made by adding 20 parts of the polyester of Example 6 to 80 parts of tolylene diisocyanate in a flask with good stirring and the maintenance of a dry atmosphere. The temperature is kept below 100 degrees C. by cooling. After cooling to room temperature, the prepolymer is incorporated into the following formula:

| | Parts by weight |
|---|---|
| Polyester of Example 6 | 108 |
| Prepolymer | 100 |
| Silicone X 521 (Union Carbide Corp.) | 0.5 |
| Dibutyl tin dilaurate (Union Carbide Corp. Stabilizer P 22) | 0.3 |
| Freon 11 | 33 |

The polyester, silicon X 521 (coupler or surface active agent) and dibutyl tin dilaurate (catalyst) are premixed until homogeneous. The prepolymer and Freon 11 are premixed. The prepolymer premix is added to the polyester premix and mixed thoroughly for about 30 seconds before pouring into the mold. The mixture is then allowed to expand. In an alternative technique, the polyester premix, prepolymer and Freon 11 are passed through separate lines into a mixing head.

Example B

In this example, the one shot technique is utilized, no prepolymer being employed.

| | Parts by weight |
|---|---|
| Polyester of Example 9 | 71 |
| Tolylene diisocyanate | 40 |
| Silicone X 520 (Union Carbide Corp.) | 0.3 |
| N,N,N,N-tetramethyl-1,3-butanediamine | 0.3 |
| Freon 11 | 15 |

The polyester, silicone X 520 and N,N,N,N-tetramethyl-1,3-butanediamine are premixed and there is added thereto a premix of the tolylene diisocyanate and Freon 11. After thorough mixing for about 30 seconds the mixture is poured into a mold and allowed to expand. Alternatively, this system can be foamed as a three component system (polyester premix, tolylene diisocyanate and Freon 11) in a conventional foaming machine.

Example C

In this example, the one shot technique is utilized, no prepolymer being employed, the blowing being effected with Freon 11.

| | Parts by weight |
|---|---|
| Polyester of Example 15 | 63 |
| Tolylene diisocyanate | 40 |
| Silicone X 521 | 0.25 |
| Dibutyl tin dilaurate | 0.15 |
| Freon 11 | 15 |

The procedure described in Example B is followed.

Example D

In this example, the one shot technique is utilized, no prepolymer being employed, the blowing being effected by carbon dioxide.

| | Parts by weight |
|---|---|
| Polyester of Example 15 | 63 |
| Tolylene diisocyanate | 57 |
| Silicone X 521 | 0.25 |
| Dimethylethanolamine | 0.2 |
| Water | 1.8 |

The polyester, silicone X 521, dimethylethanolamine and water are premixed and then the tolylene diisocyanate is added. After 15 seconds of thorough mixing, the mixture is poured into a mold and allowed to expand.

The rigid foams produced as described above were non-friable and had excellent properties. Tests thereof made in comparison with a rigid foam produced from a typical branched chain polyether by placing them in an oven at 67 degrees C. at 100% humidity for several days showed that the foam made from the commercial branched chain polyether exhibited gross distortion and a large gain in weight whereas, by way of sharp contrast, the foams made with the polyesters of the present invention exhibited little distortion and only slight gains in weight. The rigid foams made in accordance with our invention also very effectively retained the fluorohydrocarbon.

With respect to the production of the polyurethane foams utilizing the polyesters of this invention, the organic polyisocyanates, usually diisocyanates alone or in admixture with small amounts, of the order of 5 to 10% or more of triisocyanates, catalysts, stabilizers, coupler, emulsifying agents and the proportions of water (where such is used) utilized in conjunction therewith are per se known in the art. Among such organic polyisocyanates are, for instance, tolylene diisocyanate (in commercial form it is usually a mixture containing about 80% of the 2,4-isomer and 20% of the 2,6-isomer), hexamethylene diisocyanate, P-phenylene diisocyanate, triphenylmethyl triisocyanate and benzene-1,3,5-triisocyanate. Among the catalysts are N-ethyl morpholine, dimethylethanolamine and triethylamine. Among the emulsifying agents, which may be of anionic or nonionic character, may be mentioned ethylene oxide reaction products with sorbitan esters such as sorbitan monooleates, sorbitan monostearate and sorbitan monopalmitate; ethylene oxide reaction products with alkyl phenols; and mixed emulsifiers such as those sold under the designation Witco 77–86 by Witco Chemical Company, Inc. Reference is made to such patents as No. 2,779,689 for disclosures of other organic diisocyanates, catalysts, emulsifying agents, proportions of reactants to produce the polyurethane foams, and for other information generally concerning known techniques of producing the foams from polyesters. Other patents disclosing methods of producing polyurethane foams include, for instance, Nos. 2,785,739, 2,787,601, 2,788,335, and the foaming techniques disclosed therein can broadly be utilized in forming the rigid polyurethane foams from the novel polyester compositions of this invention.

The term "consisting essentially of" as used in the claims in the definition of the ingredients employed in the production of polyester is intended to exclude the presence of other materials which would interfere substantially with the properties and characteristics of the polyesters for the production of rigid polyurethane foams, but is intended not to exclude the presence of other ingredients in minor amounts and of such character as not materially adversely to affect the properties and characteristics of the polyesters for the production of rigid polyurethane foams.

What we claim as new and desire to protect by Letters Patent of the United States is:

1. A normally liquid polyester having particular utility for the preparation of rigid polyurethane foams comprising an esterification reaction product consisting essentially of (a) a mixture of an aromatic dicarboxylic acid component and a water-immiscible higher molecular weight fatty acid, with (b) a member selected from the group of alkylene oxide adducts consisting of (1) ethylene oxide adducts of aliphatic polyhydric alcohols and (2) mixed ethylene oxide and propylene or butylene oxide adducts of aliphatic polyhydric alcohols the mol ratio of the ethylene oxide to the propylene or butylene oxide being at least 2 to 1, said aliphatic polyhydric alcohols containing at least 3 hydroxy groups, said adduct containing, for each mol of said aliphatic polyhydricalcohol, such a number of mols of said alkylene oxide whereby said adduct contains from 10 to 22 milli-equivalents, per gram, of hydroxyl groups, said polyester having an hydroxyl number between 400 and 600.

2. A normally liquid polyester having particular utility for the preparation of rigid polyurethane foams comprising an esterification reaction product consisting essentially of (a) a mixture of a dicarboxylic acid component of which phthalic anhydride constitutes at least 25% by weight and a water-immiscible higher molecular weight unsaturated fatty acid, with (b) a member selected from the group of alkylene oxide adducts consisting of (1) ethylene oxide adducts of aliphatic polyhydric alcohols and (2) mixed ethylene oxide and propylene or butylene oxide adducts of aliphatic polyhydric alcohols the mol ratio of the ethylene oxide to the propylene or butylene oxide being at least 4 to 1, said aliphatic polyhydric alcohols containing predominately from 4 to 6 hydroxy groups, said adduct containing, for each mol of said aliphatic polyhydric alcohol, such a number of mols of said alkylene oxide whereby said adduct contains from 10 to 22 milli-equivalents, per gram, of hydroxyl groups, sadi polyester having an hydroxyl number between 400 and 600.

3. A normally liquid polyester having particular utility for the preparation of rigid polyurethane foams comprising an esterification reaction product consisting essentially of (a) a mixture of an aromatic dicarboxylic acid and adipic acid and a member selected from the group consisting of oleic acid and tall oil fatty acids, with (b) an ethylene oxide adduct of an aliphatic polyhydric alcohol, said aliphatic polyhydric alcohol containing from 3 to 6 hydroxy groups, said adduct containing, for each mol of said aliphatic polyhydric alcohol, such a number of mols of ethylene oxide whereby said adduct contains from 10 to 22 milli-equivalents, per gram, of hydroxyl groups, said polyester having an hydroxyl number between 400 and 600.

4. A normally liquid polyester having particular utility for the preparation of rigid polyurethane foams comprising an esterification reaction product consisting essentially of (a) a water-immiscible higher molecular weight fatty acid, with (b) a member selected from the group of alkylene oxide adducts consisting of (1) ethylene oxide adducts of aliphatic polyhydric alcohols and (2) mixed ethylene oxide and propylene or butylene oxide adducts of aliphatic polyhydric alcohols the mol ratio of the ethylene oxide to the propylene or butylene oxide being at least 2 to 1, said aliphatic polyhydric alcohols containing at least 3 hydroxyl groups, said adduct containing, for each mol of said aliphatic polyhydric alcohol, such a number of mols of said alkylene oxide whereby said adduct contains from 10 to 22 milli-equivalents, per gram, of hydroxyl groups, said polyester having an hydroxyl number between 500 and 800.

5. A normally liquid polyester having particular utility for the preparation of rigid polyurethane foams comprising an esterification reaction product consisting essentially of (a) a water immiscible higher molecular weight unsaturated fatty acid, with (b) a member selected from the group of alkylene oxide adducts consisting of (1) ethylene oxide adducts of aliphatic polyhydric alcohols and (2) mixed ethylene oxide and propylene or butylene oxide adducts of aliphatic polyhydric alcohols the mol ratio of the ethylene oxide to the propylene or butylene oxide being at least 4 to 1, said aliphatic polyhydric alcohols containing predominately from 4 to 6 hydroxy groups, said adduct containing, for each mol of said aliphatic polyhydric alcohol, such a number of mols of said alkylene oxide whereby said adduct contains from 10 to 22 milli-equivalents, per gram, of hydroxyl groups, said polyester having an hydroxyl number between 500 and 800.

6. A normally liquid polyester having particular utility for the preparation of rigid polyurethane foams comprising an esterification reaction product consisting essentially of (a) a member selected from the group consisting of oleic acid and tall oil fatty acids, with (b) an ethylene oxide adduct of an aliphatic polyhydric alcohol, said aliphatic polyhydric alcohol containing from 3 to 6 hydroxy groups, said adduct containing, for each mol of said aliphatic polyhydric alcohol, such a number of mols of ethylene oxide whereby said adduct contains from 10 to 22 milli-equivalents, per gram, of hydroxyl groups, said polyester having an hydroxyl number between 500 and 800.

7. A normally liquid polyester having particular utility for the preparation of rigid polyurethane foams comprising an esterification reaction product consisting essentially of (a) a mixture of phthalic anhydride and a lesser amount, by weight, of a member selected from the group consisting of oleic acid and tall oil fatty acids, with an ethylene oxide adduct of a mixture of pentaerythritol and glycerol in which the amount of pentaerythritol is approximately three times that of the glycerol, by weight, said adduct containing, for each mol of said mixture of pentaerythritol and glycerol, such a number of mols of ethylene oxide whereby said adduct contains from 10 to 22 milli-equivalents, per gram, of hydroxyl groups, said polyester having an hydroxyl number between 400 and 500, and an acid number between 1.5 and 2.

References Cited
UNITED STATES PATENTS

| | | | |
|---|---|---|---|
| 3,062,671 | 11/1962 | Kaupp et al. | 260—410.6 |
| 3,110,736 | 11/1963 | De Groote et al. | 260—410.6 |
| 3,138,562 | 6/1964 | Nischk et al. | 260—2.5 |
| 3,325,547 | 6/1967 | Cour et al. | 260—75 |
| 3,340,295 | 9/1967 | Wheeler et al. | 260—410.6 |

DONALD E. CZAJA, *Primary Examiner.*

R. W. GRIFFIN, *Assistant Examiner.*